United States Patent [19]

Maddox et al.

[11] Patent Number: 4,772,875

[45] Date of Patent: Sep. 20, 1988

[54] INTRUSION DETECTION SYSTEM

[75] Inventors: James F. Maddox, Arlington; Mark B. Kadonoff, Somerville, both of Mass.; Robert W. George, II, Windham; Roger A. Wendt, Londonderry, both of N.H.

[73] Assignee: Denning Mobile Robotics, Inc., Wilmington, Mass.

[21] Appl. No.: 864,032

[22] Filed: May 16, 1986

[51] Int. Cl.⁴ .................................................. G08B 19/00
[52] U.S. Cl. .................................... 340/522; 340/506; 340/508; 340/551; 340/565; 180/167; 901/1; 356/399; 342/27; 367/93; 358/108
[58] Field of Search ........ 340/522, 506, 508, 551–561, 340/565; 364/513, 516, 517; 356/1, 4, 141, 399, 400; 367/93–95; 250/336.1, 338, 491.1; 358/105, 108, 110, 113; 342/27; 901/1, 46; 307/9; 180/168, 167, 271

[56] References Cited

U.S. PATENT DOCUMENTS

| 4,087,814 | 5/1978 | Spirig | 342/27 |
| 4,437,089 | 3/1984 | Achard | 340/522 |
| 4,710,020 | 12/1987 | Maddox et al. | 901/1 |

Primary Examiner—Donnie L. Crosland
Attorney, Agent, or Firm—Joseph S. Iandiorio; Douglas E. Denninger

[57] ABSTRACT

An intrusion detector has a first sensor for monitoring a first condition and a second sensor for monitoring a second condition in a space to be protected against intrusion; a change in the condition sensed by the first sensor in a target area causes the second sensor to be aligned with the same target area; and if both sensors indicate a change in the respective conditions that they monitor an intrusion is indicated.

30 Claims, 15 Drawing Sheets

INTRUSION DETECTION SYSTEM

FIELD OF INVENTION

This invention relates to an intrusion detection system which utilizes a verification sensor to confirm changes in conditions sensed by one or more other sensors, and more particularly to such an intrusion detection system carried by a vehicle or mobile robot.

CROSS-REFERENCES

The following applications, filed concurrently herewith, are incorporated herein by reference:

| Inventors | Title | |
|---|---|---|
| Muller et al. | Ultrasonic Ranging System | U.S. Pat. No. 4,701,893 |
| Benayad-Cherif et al. | Position Locating System for Vehicle | serial no. 684,081 |
| Pavlak et al. | Power-Up Sequencing Apparatus | serial no. 864,590 |
| Maddox et al. | Beacon Proximity Detection System for Vehicle | U.S. Pat. No. 4,710,020 |
| Kadonoff et al. | Orientation Adjustment System and Robot Using Same | serial no. 864,450 |
| Kadonoff et al. | Obstacle Avoidance System | serial no. 864,585 |
| Kadonoff et al. | Beacon Navigation System and Method for Guiding a Vehicle | serial no. 864,442 |
| George II et al. | Recharge Docking System for Mobile Robot | serial no. 864,028 |

BACKGROUND OF INVENTION

Much effort is expended in attempts to effectively secure premises from intruders. Human guards provide the most versatile but not necessarily the most reliable or cost-effective protection. Guards can patrol for only a limited number of hours at a time, are sometimes drowsy and inattentive during patrol, and are expensive.

There is a strong need for automated security systems which supplement or replace patrolling guards. Perimeter alarm systems such as door and window sensors attempt to establish a barrier about the exterior of the premises at possible points of entry. Precisely because they are located at these known points they can be circumvented by knowledgeable intruders.

Automated protection within a premises is typically provided by one or more types of fixed volumetric detectors also known as space alarms. Stationary microwave devices emit microwave radiation at a known frequency and analyze returned radiation to determine changes in frequency induced by moving objects. Motion of an intruder produces a Doppler-effect shift in the received radiation. Passive infrared detectors provide another type of volumetric detection. These detectors receive infrared radiation to determine when a heat source such as a human body moves within its field of view. Ultrasonic detectors emit high-frequency sound waves which are reflected by objects in its path. A change in the amount or frequency of returned radiation indicates the approach of an intruder.

Each of the above-mentioned types of volumetric detectors senses a particular condition within its field of view. Accordingly, each is susceptible to particular non-intruder events which generate a false alarm. Changes in building climate control, start-up of ventilation fans and turbines, and other non-threatening events may interfere with the sensors. While increasing sensitivity of the detectors increases the likelihood of intruder detection, it also increases the chances of costly false alarms. In some areas it is necessary to decrease sensitivity to avoid false readings. Further, the reliability of individual sensors poses problems since they eventually fail over time.

In an attempt to improve reliability without sacrificing sensitivity, some systems combine two or more types of sensors and align them to share fixed, overlapping fields of view. A simple AND circuit or comparator approach requires simultaneous changes in the two or more sensed conditions before generating an alarm.

SUMMARY OF INVENTION

It is therefore an object of this invention to provide an improved intrusion detection system which uses two or more types of sensors to accurately detect abnormal conditions.

It is a further object of this invention to provide such an intrusion detection system which employs a first type of sensor to trigger an alarm in a target area and then bringing a second type of sensor to bear on the same target to provide a confirmed alarm only if the second sensor also indicates an alarm;

It is a further object of this invention to provide such an intrusion detection system which provides highly reliable alarm readings.

It is a further object of this invention to provide such an intrusion detection system which minimizes false alarms.

It is a further object of this invention to provide such an intrusion detection system that enables use of higher sensitivity.

It is a further object of this invention to provide such an intrusion detection system which can selectively adjust the sensitivity of one or more sensors.

It is a further object of this invention to provide such an intrusion detection system that can reinterrogate one or more sensors.

A still further object is to provide such an intrusion detection system which can be deployed in a vehicle or mobile robot.

Yet another object of this invention is to provide such an intruder detection system which utilizes both mobile and stationary activities of the vehicle or robot to detect intruders.

The invention results from the realization that a truly unique and effective intrusion detection system can be accomplished by causing the sensing of an apparent intruder in a target area by a first sensor to cause a second sensor to be aimed at the same target area and then confirming an intrusion only if the second sensor also detects an intrusion in the same target area.

This invention features an intrusion detection system including first sensor means for monitoring a first condition and a second sensor means for monitoring a second condition in a space to be protected against intrusion. There are means responsive to a change in the condition sensed by the first sensor means in a target area for aligning the second sensor means with the target area and means responsive to a change in the condition sensed by the second sensor means and the first sensor means for indicating an intrusion.

In a preferred embodiment one of the sensor means is an infrared sensor and the sensing means is a microwave sensor. One or both of the sensor means may include a plurality of spaced sensing elements, each with a different field of view. The first and second sensor means may be movable relative to one another or may be movable with one another with relation to a target area.

There may be means for progressively increasing the sensitivity of at least one of the sensor means and means responsive to a change in condition sensed by one of the sensor means for halting the increase in sensitivity and re-interrogating that sensor a predetermined number of times. An alarm value is calculated as a function of the ratio of the number of alarms to the number of re-interrogations and of the sensitivity level.

The microwave sensor may include a microwave antenna for emitting microwave energy and receiving reflected microwave signals. The antenna emits radiation at a first frequency and further includes means for mixing the return signal with the emitted signal to obtain a difference signal. There are threshold means for setting the alarm sensitivity threshold and comparator means for providing an alarm output when the difference signal exceeds the threshold. There are also means for varying the alarm sensitivity threshold provided by the threshold means.

The intrusion system may be included in a vehicle such as a mobile robot; the robot may include means for determining the velocity of the robot. Filter means are interconnected between the antenna and the comparator means and responsive to the velocity means for blocking the Doppler component of the differential signal imparted by the robot velocity. The robot may also include drive wheels and a drive system including a drive motor, as well as an encoder responsive to the motor for indicating the velocity of the robot.

The robot may include a body section and a head section, and the body section may include the drive wheels, drive system and encoder. The robot may also include means for rotating the head and body sections relative to one another, and the body section may include a steering system for steering the drive wheels. The head section may be coupled with the steering system so that it rotates relative to the body section in synchronism with the wheels. One of the sensor means may be on one of the sections and the other sensor means may be on the other section. The first sensor means may include an I/R sensing means and be mounted on the body section, and the second sensing means may include microwave sensing means and may be mounted on the head section.

BRIEF DESCRIPTION OF DRAWINGS

Other objects, features and advantages will occur from the following description of a preferred embodiment and the accompanying drawings, in which.

DISCLOSURE OF PREFERRED EMBODIMENT

Figure 1:
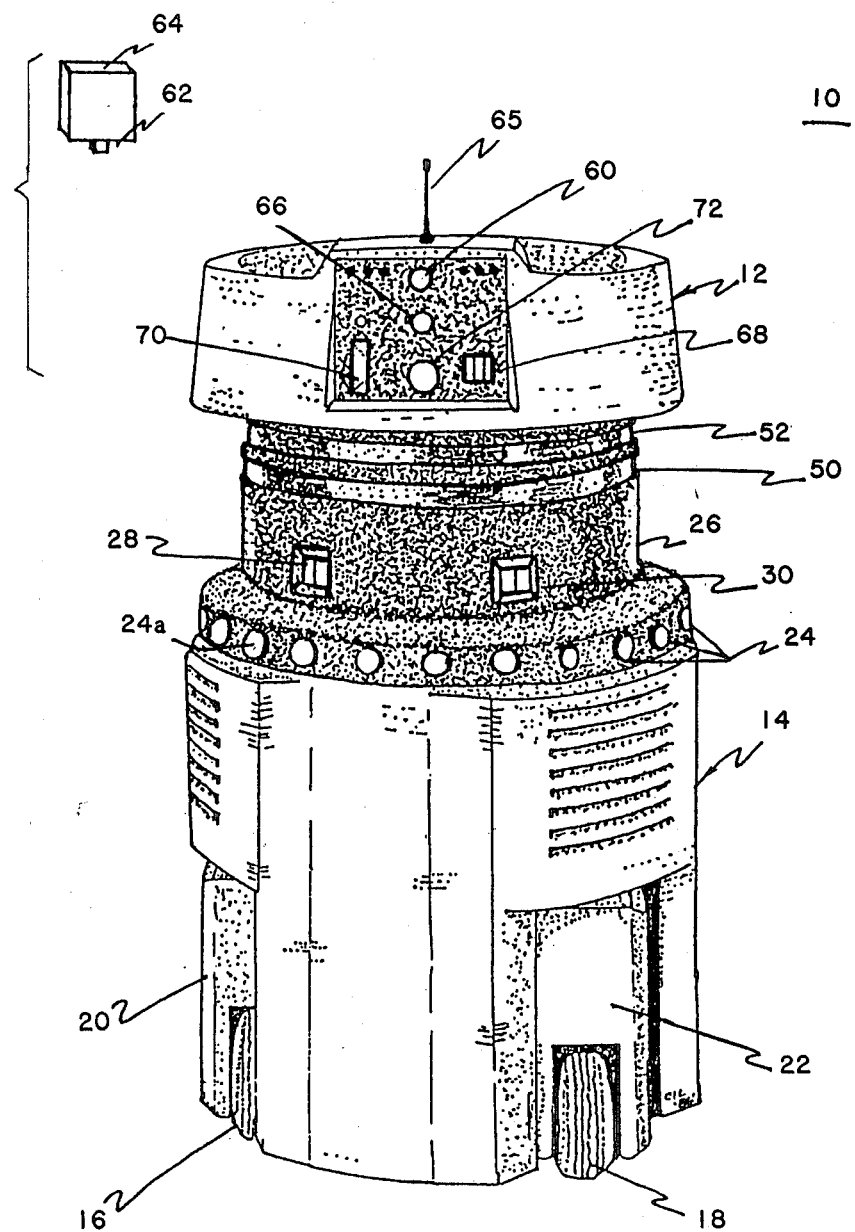
FIG. 1 is an axonometric view of a robot incorporating the intrusion detection system according to this invention.

There is shown in FIG. 1 a vehicle, robot 10 according to this invention including a head section 12 and a base 14 movable on three wheels, only two of which, 16, 18, are visible. The wheels are mounted in three steerable trucks, only two of which, 20 and 22, are visible. There are twenty-four ultrasonic transducers 24 such as the electrostatic transducer of the Sell type available from Polaroid equally spaced at fifteen degrees around the periphery of base 14. Above that on reduced neck 26 there are located six passive infrared motion detectors 28, 30, 32, 34, 36, 38, only two of which, 28 and 30, are shown. These detectors are equally spaced at sixty degrees apart and may be DR-321's available from Aritech. Just above that are two conductor bands 50 and 52 which are used to engage a charging arm for recharging the robot's batteries. Head section 12 is mounted to base 14 and rotates with respect to base 14 about a central vertical axis. Head section 12 carries an RF antenna 65 for sending and receiving communication signals to a base location or guard station. Head section 12 also includes an infrared sensor 60 for sensing radiation in the near infrared region, e.g. 904 nanometers, such as emitted from LED 62 of beacon 64, one or more of which are mounted on the walls in the space to be protected by robot 10 to assist in locating and directing robot 10 in the area in which it is to patrol. An ultrasonic transducer 66 similar to the transducer 24 used for maneuvering and avoidance may be provided for ranging. There is also provided a passive infrared sensor 68 similar to sensors 28–38. A microwave transmission and reception antenna 70 and a TV camera 72 which may be turned on when an apparent intrusion has occurred are also included in head 12.

Figure 2:
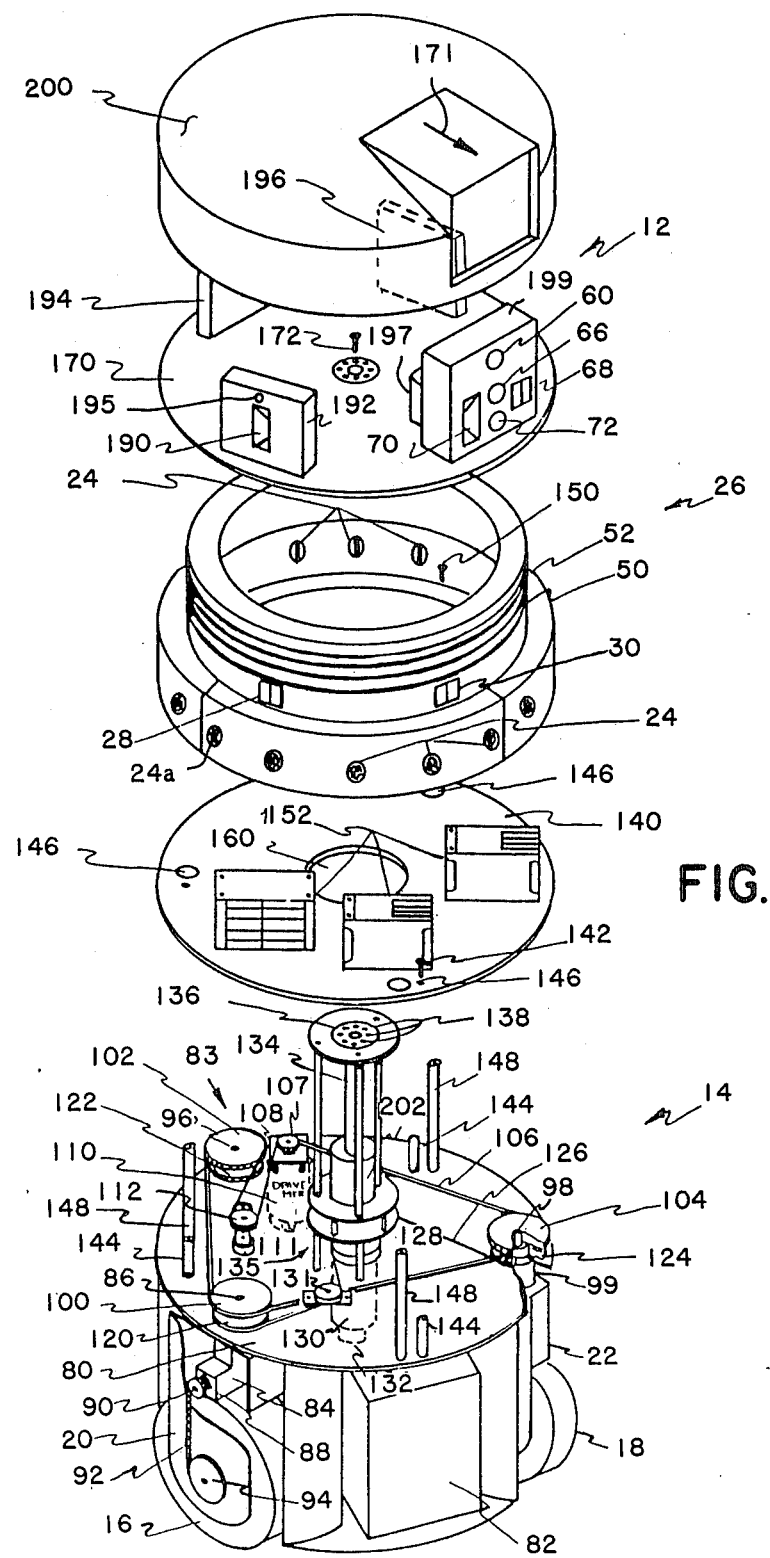
FIG. 2 is a simplified exploded view with parts removed of the robot of FIG. 1.

Base 14, FIG. 2, includes a main chassis 80 which carries three batteries 82 such as GLOBE 12V 80AH GEL cells, only one of which is shown. When fully charged they will operate the robot for twelve hours or more. Trucks 20 and 22, with wheels 16 and 18 respectively, are suspended from chassis 80. Each truck as indicated at truck 20 includes a right-angle drive 84 which receives input from vertical drive shaft 86 and provides output on horizontal drive shaft 88, which operates pulley 90, which in turn through belt 92 drives pulley 94 attached to the axle of wheel 16. Vertical drive shaft 86 and counterpart drive shafts 96 and 98 are driven by their respective sprockets or pulleys 100, 102, 104 which in turn are driven by endless belt 106 powered by the pulley 107 on output shaft 108 of drive motor 110 mounted beneath chassis 80. An encoder 111 mounted with motor 110 monitors the velocity of the robot. An idler wheel 112 is provided to maintain proper tension on belt 106. Three additional shafts, only one of which, 99, is shown, concentric with shafts 86, 96 and 98, respectively, are driven by a second set of pulleys or sprockets 120, 122, 124 engaged with drive belt 126 powered by sprocket 128 driven by steering motor 130 mounted beneath chassis 80. Idler pulley 131 is used to maintain tension on belt 126. An encoder 132 is associated with steering motor 130 to provide outputs indicative of the steering position. The steering motorshaft is connected through pulley 128 to extension shaft 134, the top of which is provided with a flange 136 with a plurality of mounting holes 138. Electronic chassis 140 is mounted by means of screws 142 on three shorter standoffs 144. Three holes 146 in electronic chassis 140 accommodate the pass-through of longer standoffs 148, which mount neck 26 by means of screws 150. Electronic chassis 140 contains all of the electronic circuit boards and components such as indicated at items 152 that are contained in the base 14, including the status module described infra.

When an electronic chassis 140 and neck 26 are mounted on their respective standoffs, extension shaft 134 and flange 136 and the associated structure are accommodated by the central hole 160 in electronic chassis 140 and the opening in neck 26 so that the head plate 170 may be mounted by means of screws 172 to threaded holes 138 in flange 136. In this way the entire head rotates in synchronism with the trucks and wheels as they are steered by steering motor 130. In addition to the primary microwave sensor 70 there are three additional microwave sensors 190, 330, 332, only one of which, 190, is visible, spaced at ninety degrees about head plate 170 mounted in housings 192, 194, and 196. Housing 194 which faces directly to the back of the head as opposed to primary microwave sensor 70 which faces front, also contains a second infrared sensor 334, not visible, which is the same as infrared sensor 68. Cover 200 protects the electronics on head plate 170. All of the electrical interconnections between head 12 and base 14 are made through slip rings contained in slip ring unit 202 mounted about extension shaft 134 in base 14.

Figure 3:
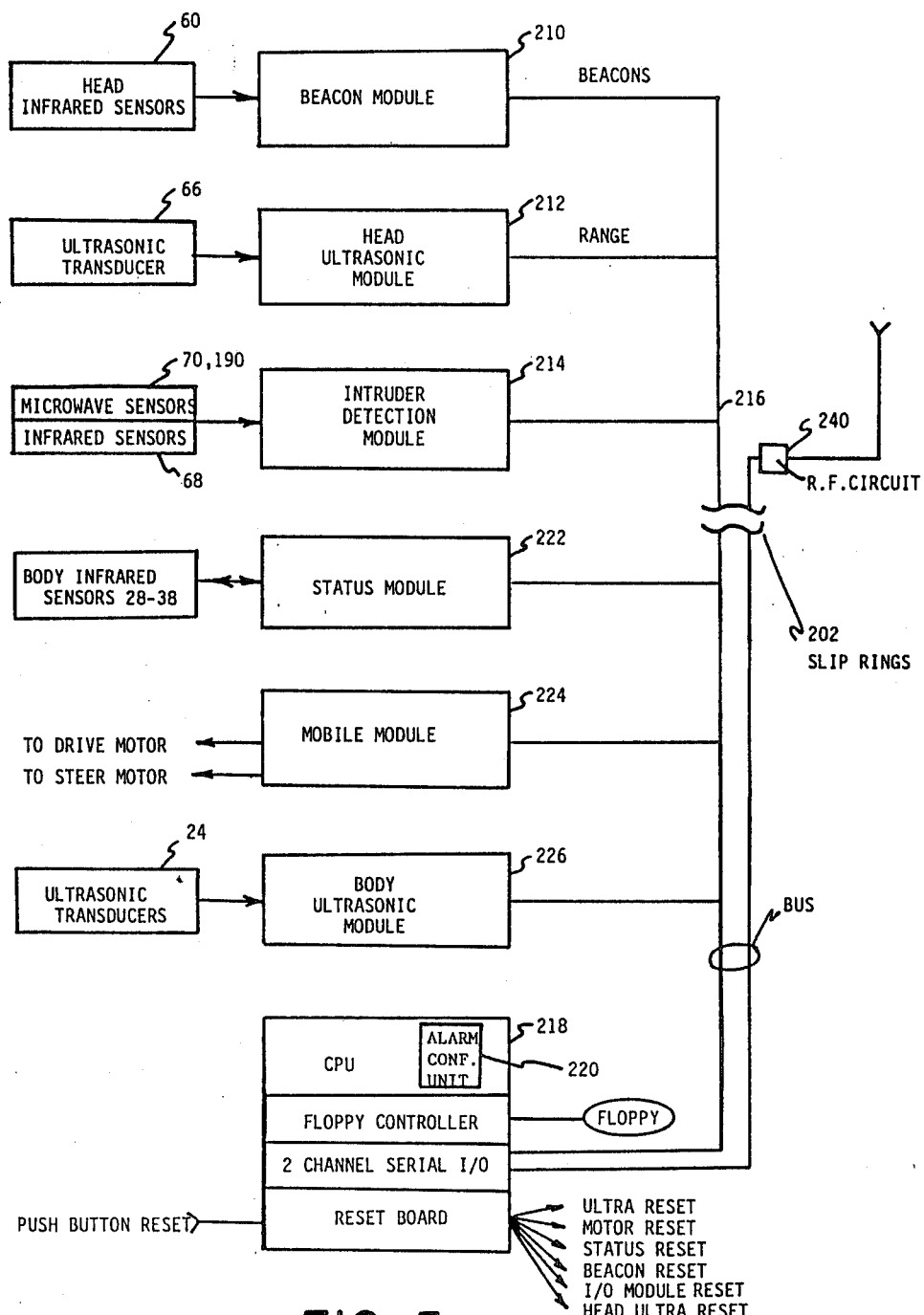
FIG. 3 is a block diagram of the electronic modules included in the robot of FIGS. 1 and 2.

Head 12, FIG. 3, includes three electronic portions: beacon module 210, head ultrasonic module 212, and intrusion detection module 214. Beacon module 210 responds to the head IR sensor 60 to determine what angle the beacon 64 is with respect to the robot. That angle is fed on bus 216 through the slip ring unit 202 to the main CPU 218. Head ultrasonic module 212 responds to ultrasonic transducer 66 to provide ranging information on bus 216 to CPU 218. Intruder detection module 214 responds to four microwave sensors 70, 190, 330, 332, and the two IR sensors 68, 334 to provide indications as of yet unconfirmed intrusion events. As will be explained subsequently, these events are processed by the alarm confirmation unit 220 in CPU 218 to determine whether a true confirmed intrusion has occurred. In the body section 14, there is included status module 222 mobile module 224, body ultrasonics module 226, and CPU 218. Status module 222 responds to the six infrared sensors 22-38 to provide an indication of an intrusion. Status module 222 may also monitor fire and smoke detectors, diagnostic sensors throughout the robot, as well as chemical and odor detectors and other similar sensors. Mobile module 224 operates and monitors the action of drive motor 110 and steering motor 130. The twenty-four ultrasonic transducers 24 provide an input to the body of ultrasonic module 226, which guides the movement and obstacle avoidance procedures for the robot. Finally, body 14 contains CPU 218, which in addition to the alarm confirmation unit 220 also interconnects with a floppy disk controller, two-channel serial I/O boards, and a reset board which receives inputs from a pushbutton reset and CPU 218 and outputs ultrasonic resets, motor resets, status resets, beacon resets, I/O module resets and head ultrasonic resets. CPU 218 also receives inputs from RF antenna 65 through RF circuit 240.

Figure 4A:
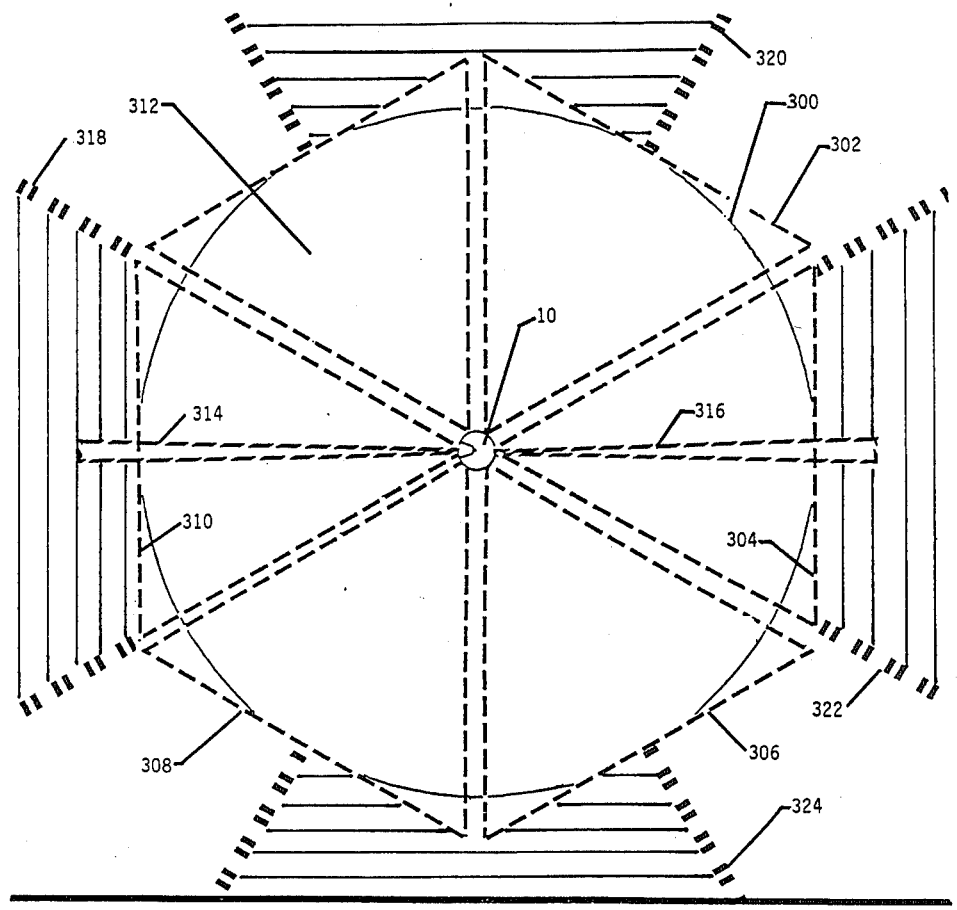
FIG. 4A is a plan view of the fields of view of the ultrasonic infrared and microwave sensors of the robot of FIG. 1.
Figure 4B:
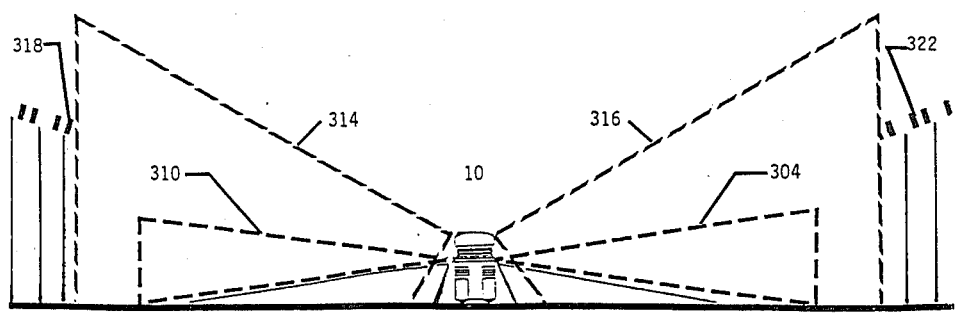
FIG. 4B is a side elevational view taken along line 4B—4B of FIG. 4A, showing the vertical profile of the fields of view.

A top plan view of the fields of view of the various sensors and transducers is shown in FIG. 4A. The twenty-four ultrasonic transducers 24 have a complete 360° field of view 300. The six infrared sensors 28, 30, 32, 34, 36, 38, on body 14 provide six triangular fields of view 302, 304, 306, 308, 310 and 312. The two infrared sensors 68 and 334 on head 12 provide the narrower fields of view 314 and 316, and the four microwave transducers 70, 190, 330, 332 provide the four fields of view 318, 320, 322 and 324. The vertical profile of these fields is depicted in FIG. 4B. The fied of view of the microwave transducers extends approximately one hundred fifty feet. That of the infrareds in the head xtend about thirty feet, those of the infrared in the body about twenty-five feet, and the ultrasonics in the body also extend about twenty-five feet.

Figure 5:
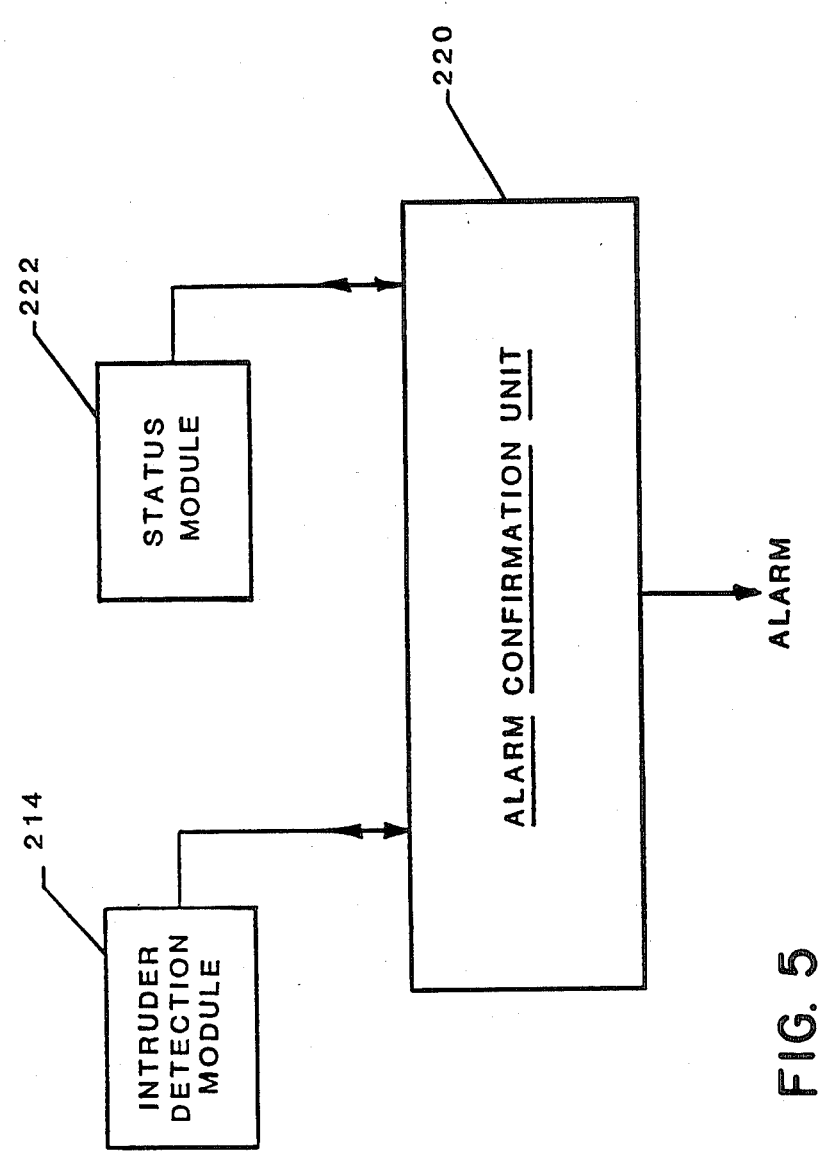
FIG. 5 is a block diagram showing the interconnection of the intrusion detection module and status module with the alarm confirmation unit of FIG. 3.

The intrusion detection system employs the alarm confirmation unit 220, FIG. 5 to respond to the six passive infrared sensors around the body 28-38 through status module 222 and to respond to the passive infrared sensors 68, 334 and the microwave transducers 70, 190, 330, 332 in the head through intrusion detection module 214.

Figure 6:
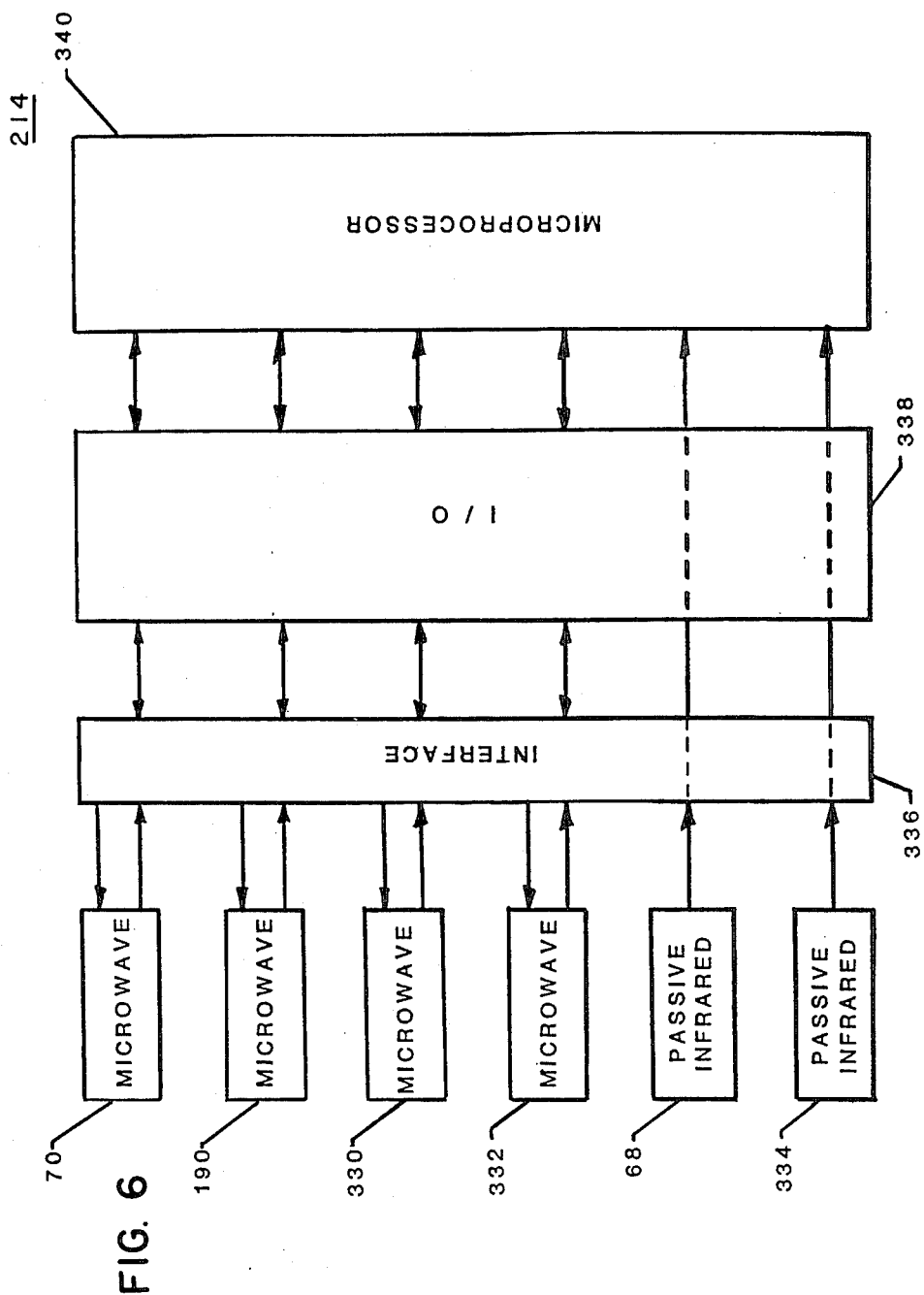
FIG. 6 is a more detailed block diagram of the intrusion detection module.

Intrusion detection module 214, FIG. 6, responds to the four microwave transducers 70, 190, 330 and 332 spaced at zero, 90°, 180° and 270°, respectively, about the head, and to passive infrared sensors 68 and 334 at zero and 180° on the head, respectively. The outputs from the four microwave transducers and the passive infrared transducers 68 and 334 are transmitted through interface 336 and I/O circuit 338 to microprocessor 340 such as a Z80.

Figure 7:
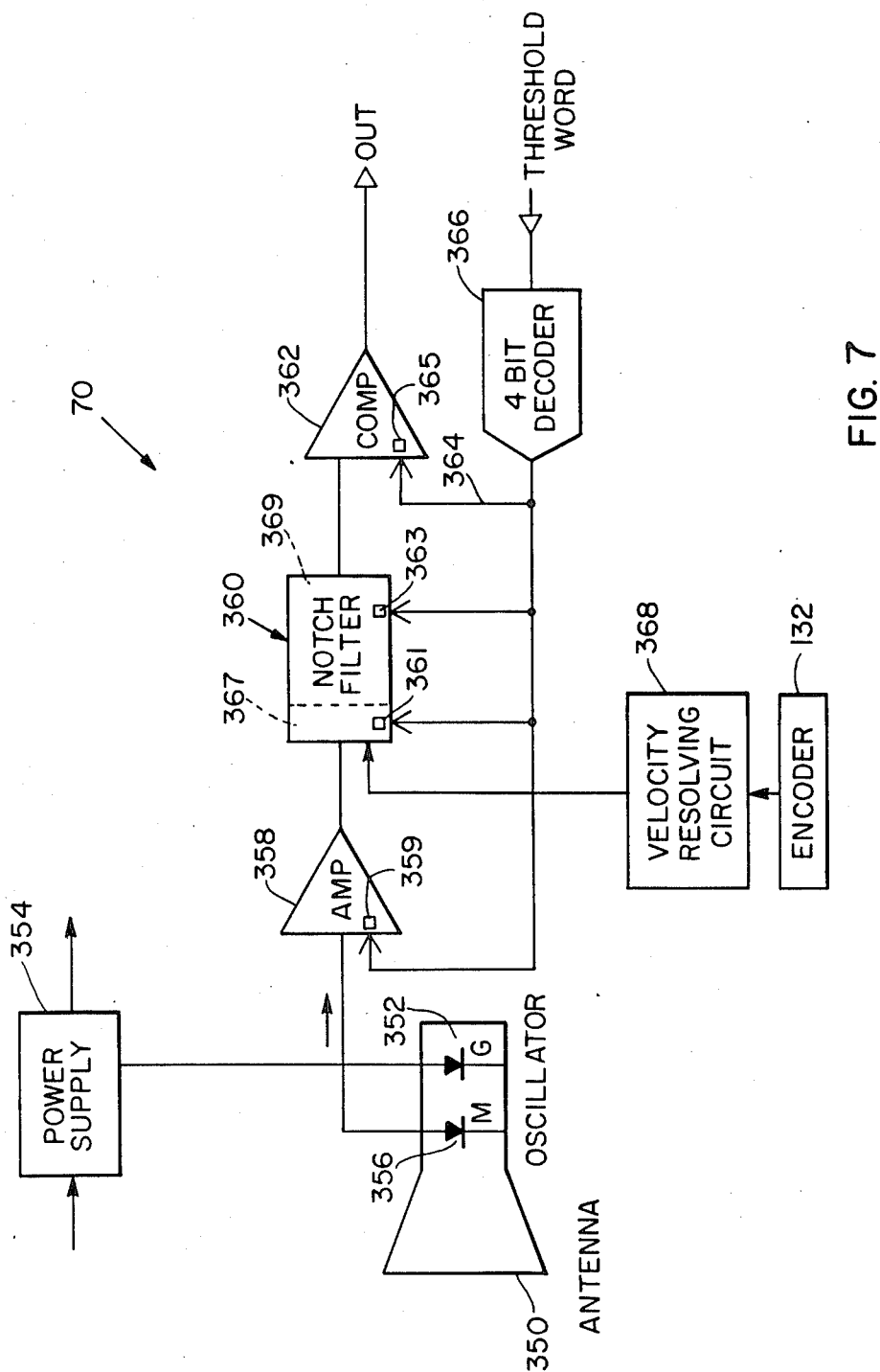
FIG. 7 is a more detailed view of a microwave sensor of FIG. 6.

Each microwave sensor, as exemplified by sensor 70, FIG. 7, includes a microwave antenna 350, whose oscillator 352 is driven to operate at 10 GHz by power supply 354. The reflected 10 GHz signal is received by diode 356. The two signals are mixed or beat, and the difference signal is provided to amplifier 358. The output is then fed through filter 360 to a comparator 362. If the signal from filter 360 exceeds the threshold implemented by switch 365 as controlled by signals supplied through line 364, comparator 362 provides an output indicating an unconfirmed alarm. The threshold control signal is supplied by four-bit decoder 366 to analog switch 365. Decoder 366 alters the gain of amplifier 358 and two stages 367, 369 within filter 360 by switches 359, 361, 363, respectively. Decoder 366 receives its instruction on bus 216 from CPU 218. The input to decoder 366 may be varied gradually to progressively move the threshold and gains from the least sensitive level to the most sensitive level, as will be explained hereinafter. When the robot is moving, a returning microwave signal will be Doppler shifted due to the velocity of the robot. To accommodate for this, the velocity of the robot is provided by encoder 132 to velocity resolving circuit 368, whose output is used to operate filter 360 as a notch filter to block that portion of the difference signal corresponding to the Doppler shift imparted by the velocity of the robot.

Figure 8:
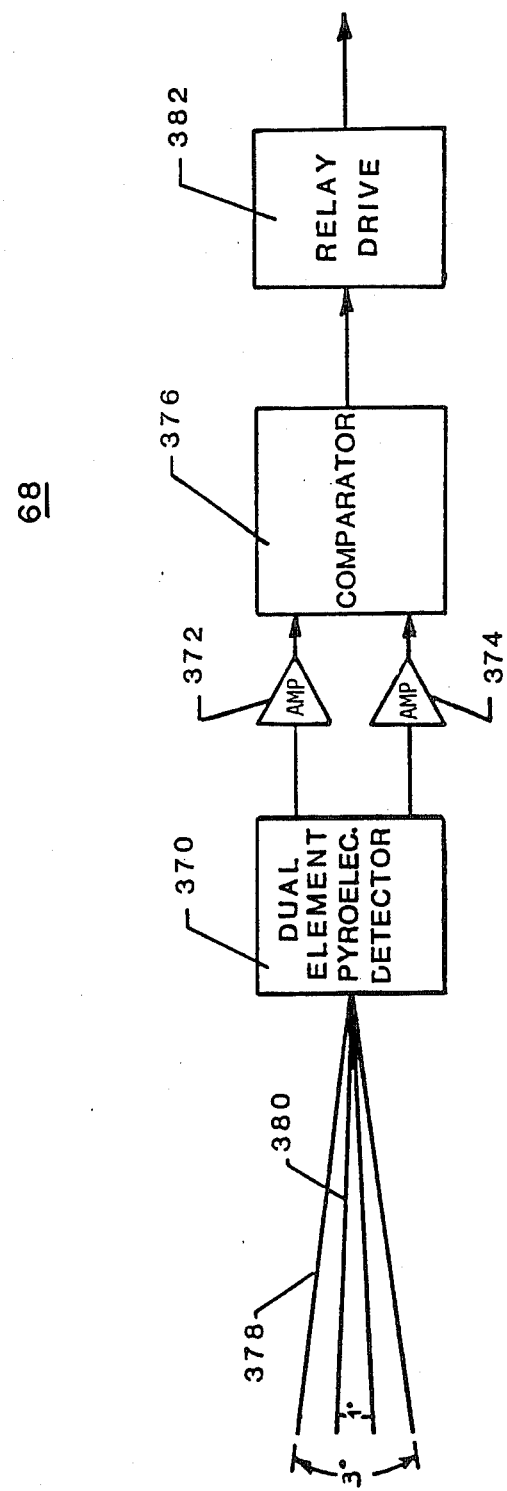
FIG. 8 is a more detailed block diagram of a passive infrared sensor of FIG. 6.

Each of I/R sensors 68 and 334, FIG. 8, includes a dual-element pyroelectric detector 370 whose outputs are fed through amplifiers 372 and 374 to a comparator 376. One of the dual elements responds to a three-degree conical field of view 378, while the other responds to a one-degree conical field of view 380. The elements are operated in a balanced mode so that if the background in one field of view suddenly changes with respect to the background in the other, this is detected by comparator 376 and relay drive 382 is operated to indicate an unconfirmed alarm.

Figure 9:
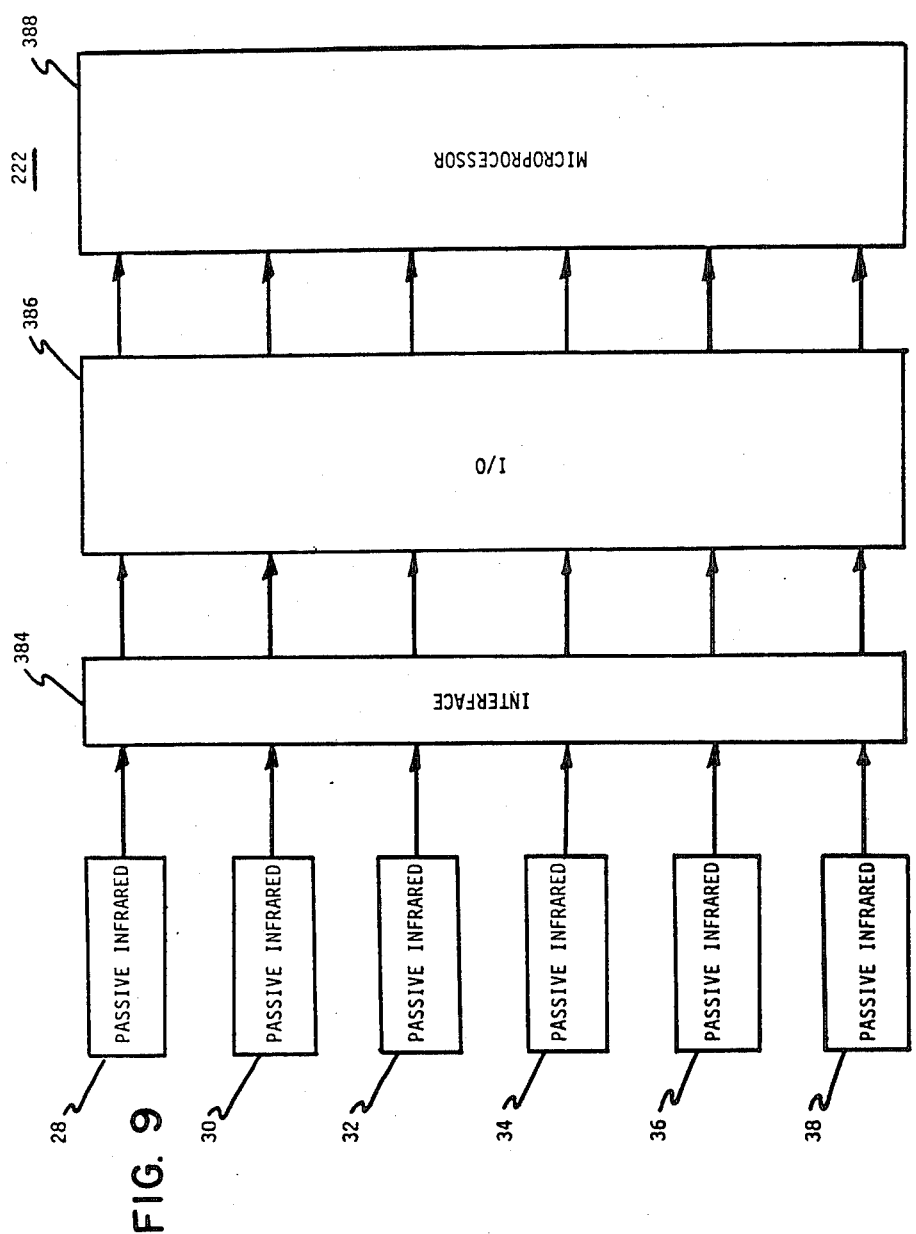
FIG. 9 is a more detailed block diagram of the status module of FIG. 5.
Figure 10:
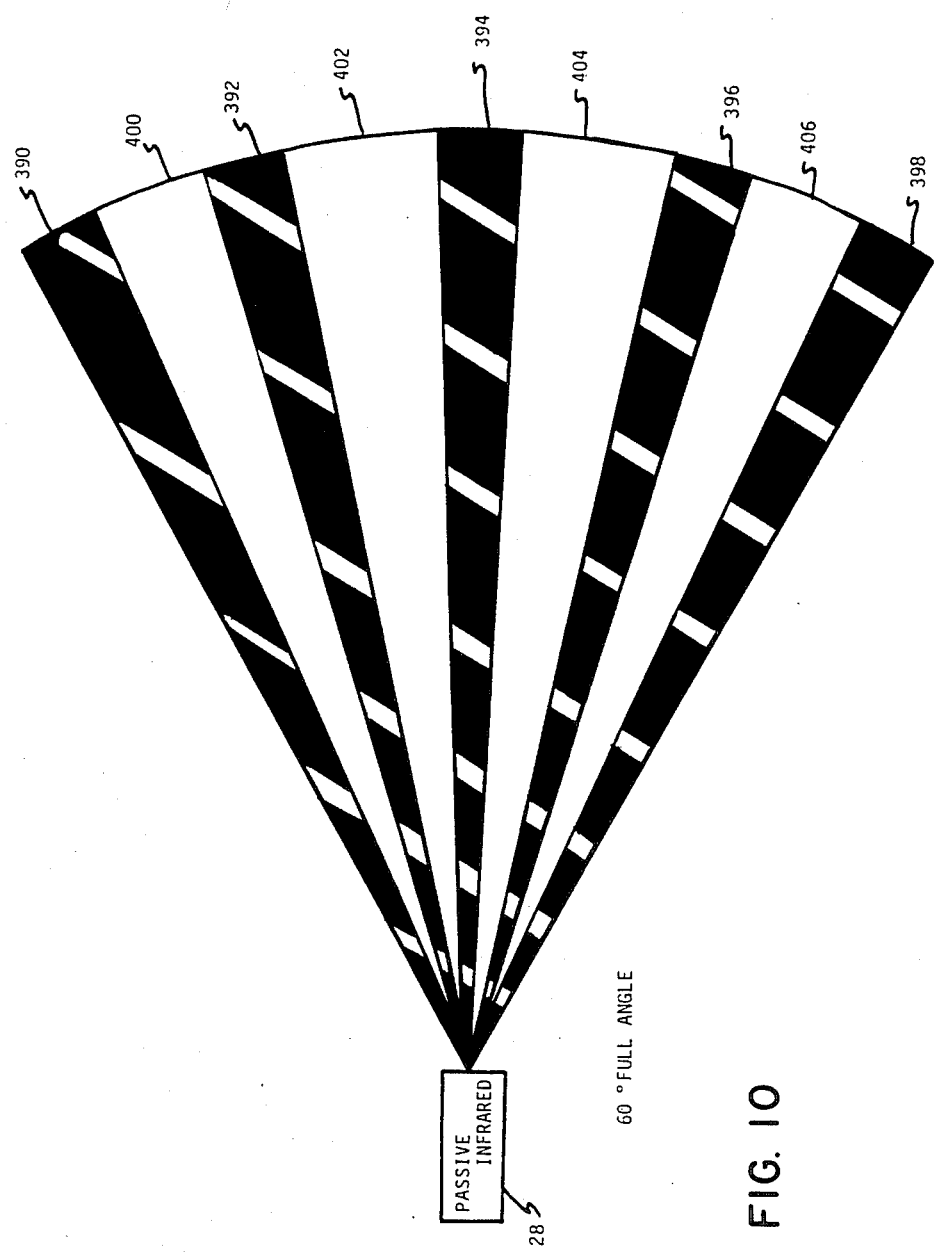
FIG. 10 is a diagram of the field of view of a passive infrared sensor of FIG. 9.

Status module 222, FIG. 9, receives the input of six passive infrared sensors 28, 30, 32, 34, 36 and 38 through interface 384 and I/O circuit 386 to microprocessor 388, which may be a Z80. The field of view of these infrared detectors is flat or fan-shaped as shown in FIG. 10 with respect to sensor 28. These may be implemented by an Aritech DR-321 and are also dual-element devices: one element responds to sectors 390, 392, 394, 396 and 398 as a group, while the other element responds to sectors 400, 402, 404 and 406 as a group. Any change between the balanced backgrounds of these two groups results in an output utilizing the same circuit as shown in FIG. 8.

Figure 11:
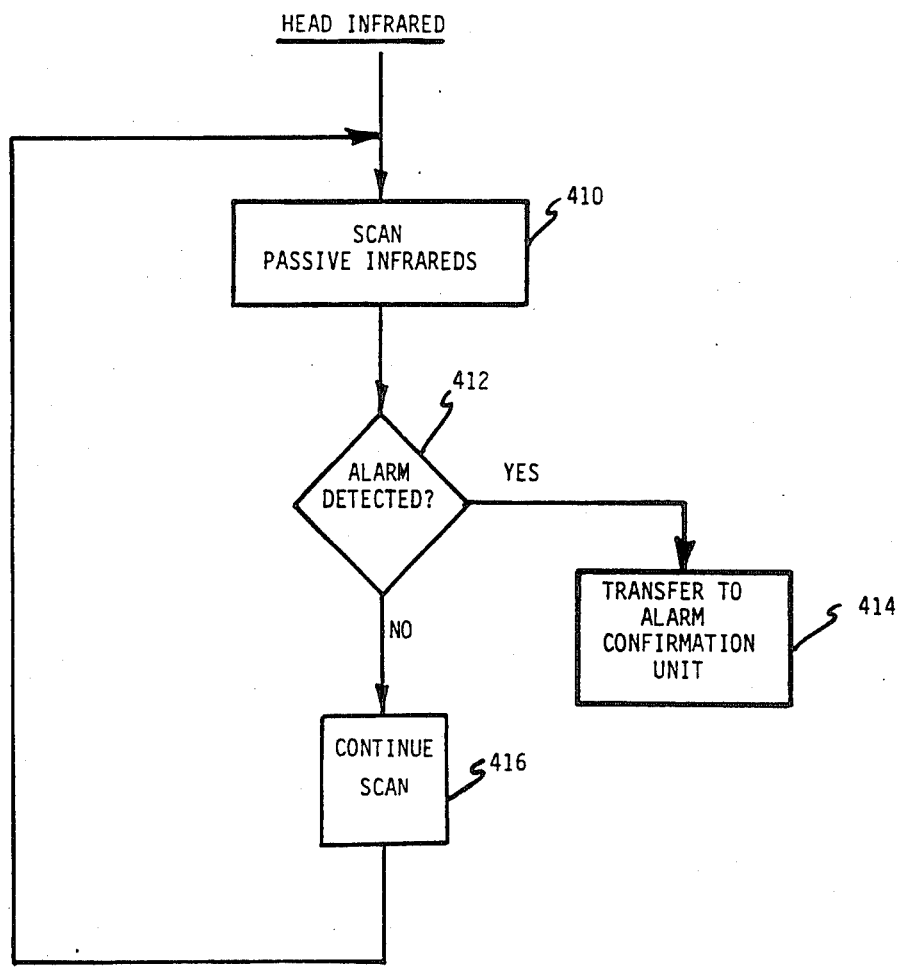
FIG. 11 is a flow chart of the software control of the passive infrared sensors in the head and body of the robot.

The software routine used by microprocessor 340, FIG. 6, in intrusion detection module 214 to control the head IR sensor 68, 334 begins with the step 410, FIG. 11, of scanning each of the passive infrared sensors 68 and 334. If an alarm is detected in step 412, then the system is transferred to the alarm confirmation unit 220 (see FIG. 13). If no alarm is detected in step 412 the scan is continued in step 416 and the system returns to step 410. The same routine is used for the body infrared scanners 28-38 in microprocessor 388 in the status module 222.

Figure 12:
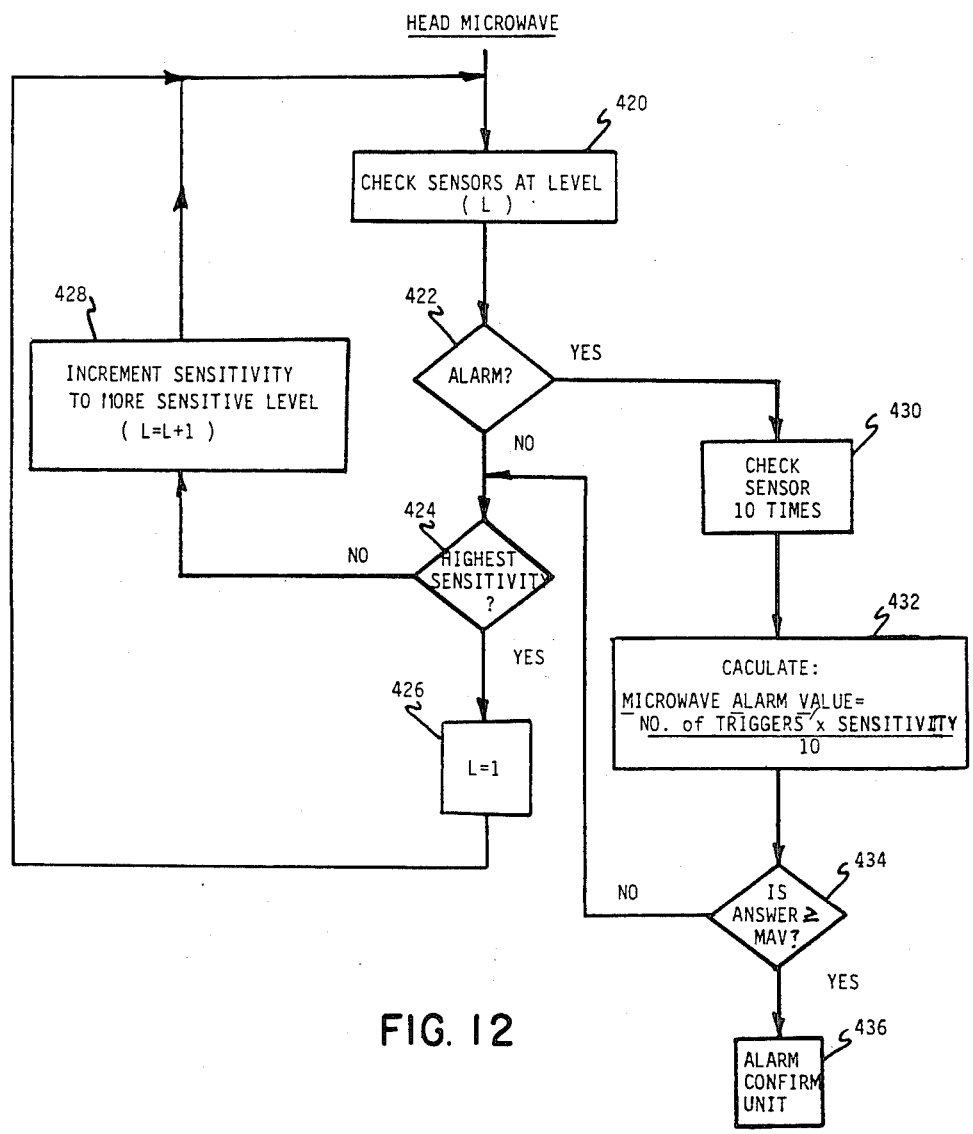
FIG. 12 is a flow chart of the software control of the microwave sensors in the head of the robot.

A separate routine, FIG. 12, may be used in microprocessor 340 to control microwave sensors 70, 190, 330 and 332. First the sensors are checked at an initial sensitivity level L in step 420. If no alarm is detected in step 422 at that sensitivity level then the determination is made in step 424 as to whether the system is at the highest sensitivity level. If it is, then it resets to L=1 in step 426 and returns to initial step 420. If it is not at the highest sensitivity level, then in step 428 the sensitivity level is incremented to the next most sensitive step L+1and the system is returned to step 420. If in step 422 an alarm is found, then in step 430 the sensor is made to check again ten times in succession, then in step 432 there is calculated a value equal to the number of alarm triggers multiplied by the sensitivity divided by the number of re-interrogations, in this case ten. If that value exceeds the microwave alarm value in step 434, then an unconfirmed alarm is indicated and the system is referred to the alarm confirmation unit (see FIG. 13). If the microwave alarm value is not exceeded then the system is returned to step 424.

Figure 13:
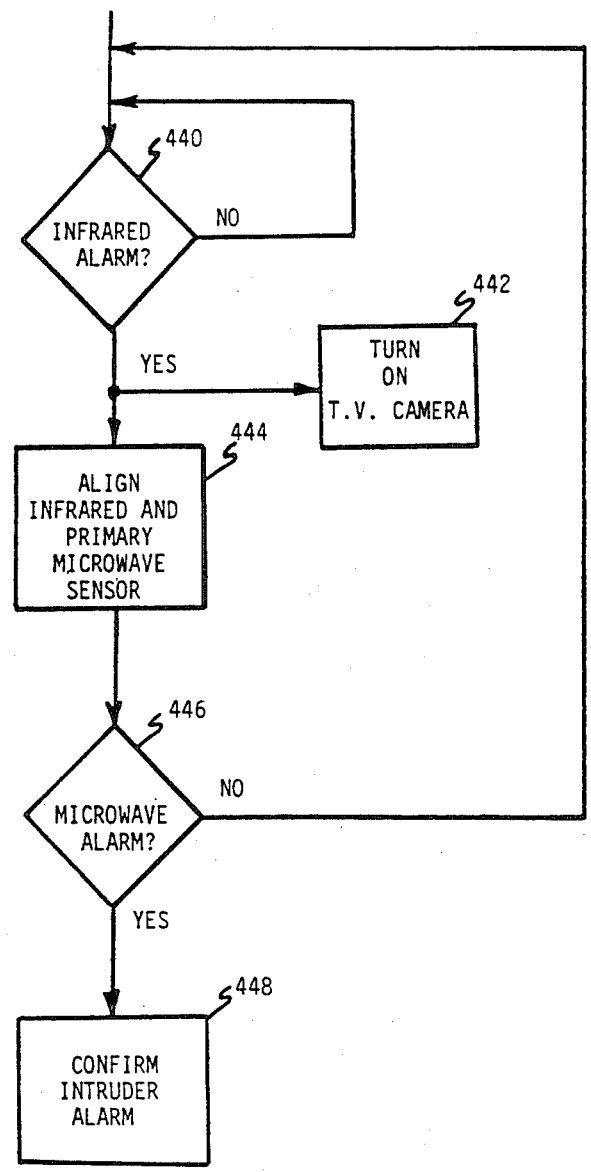
FIG. 13 is a flow chart of the alarm confirmation software in the alarm confirmation unit of the CPU.

The alarm confirmation unit, FIG. 13, is set to check whether there has been an unconfirmed infrared alarm as indicated by the routine in FIG. 11, step 440. If there is no alarm then the system simply returns to step 440. If there is an alarm, the TV camera 72 is turned on in step 442 and in step 444 the head is rotated to align the infrared sensor that indicated the unconfirmed alarm and the primary microwave sensor 70. In step 446, if there is no microwave alarm, as indicated by the routine in FIG. 12, then the system returns to step 440. If there is an unconfirmed microwave alarm as well, then the system provides a confirmed intruder alarm in step 448.

In order to identify which sensor has indicated an alarm, the azimuthal orientation of that sensor must be determined. Several notations describe the orientation of head 12 to body 14, FIG. 14. Arrow 1300 represents the forward-facing direction of robot 10. The azimuthal orientation of body 14 is fixed in space and is represented by print 302, hereinafter referred to as sensor zero. Sensor zero is a designated, fixed point on body 14 itself, e.g., IR sensor 28, FIG. 1. The angle between head front 1300 and sensor zero is $\theta_D$. The azimuthal angular distance from global zero to sensor zero is represented by $\theta_B$; arrows 1304 represent the designated orientation for the surrounding environment.

Figure 14:
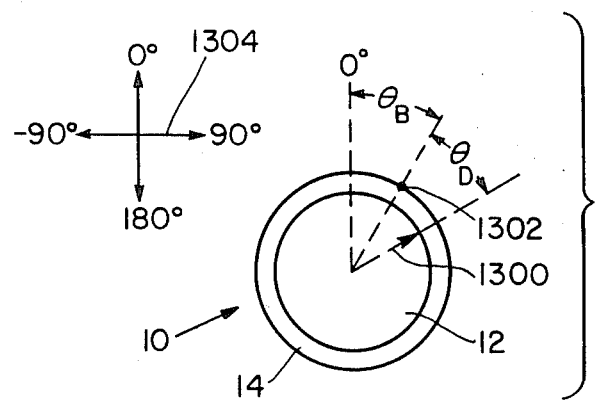
FIG. 14 is a schematic top plan view showing the relationship of the head and the body to each other and relative to the environment.
Figure 15:
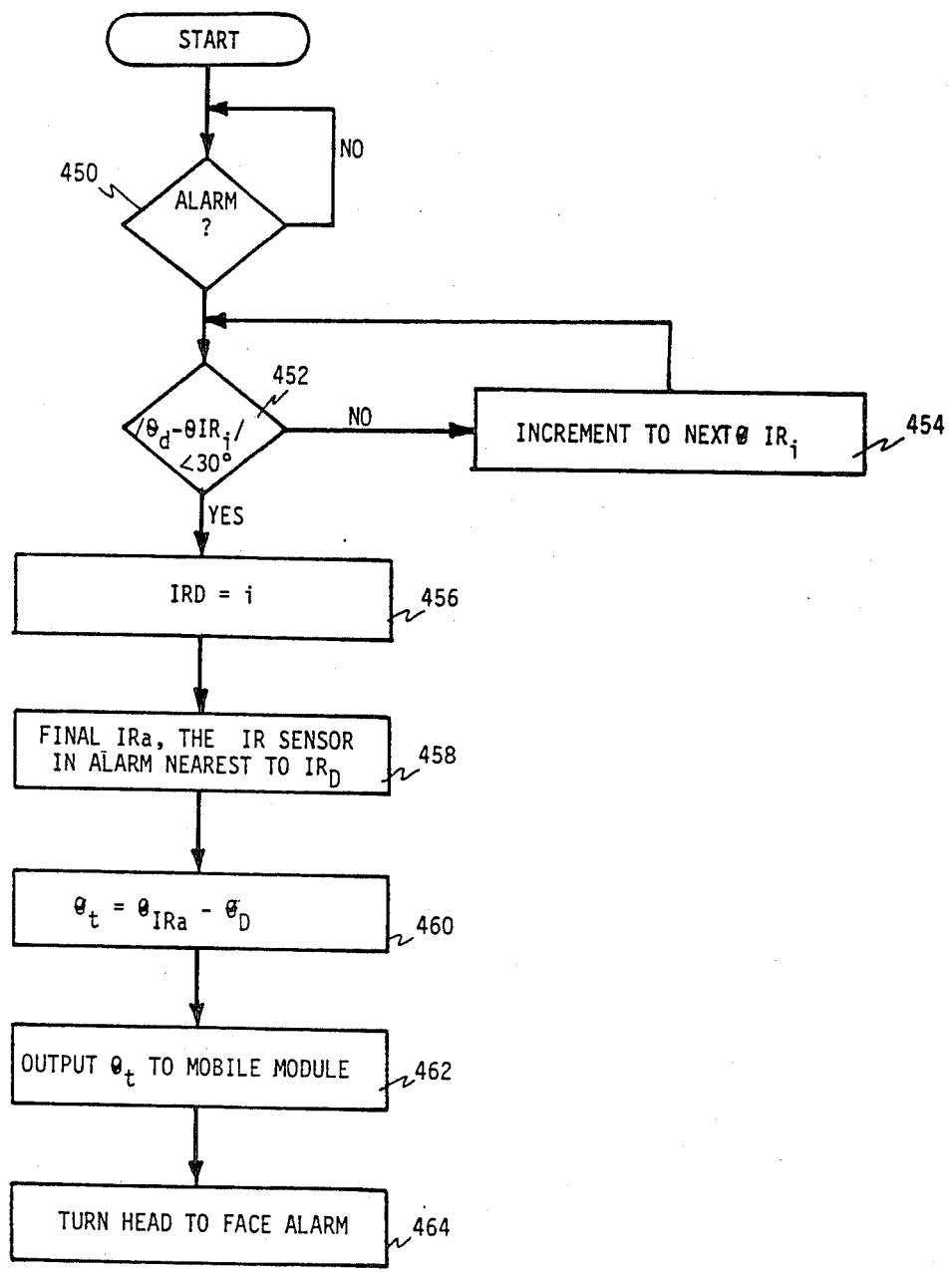
FIG. 15 is a flow chart of identifying and turning toward a body IR sensor which indicates an alarm.

The operation of identifying the body IR sensor which indicated an alarm and turning the head to face that sensor is shown in FIG. 14. After an IR alarm is detected, step 450, the forward facing IR sensor is found, steps 452, 454. Each IR sensor $IR_i$ has a known heading in relation to sensor zero as shown in Table I.

TABLE I

| BODY IR LOOK-UP | |
|---|---|
| Sensor Number | Heading ($\theta IR_i$) |
| 0 | 0° |
| 1 | 60° |
| 2 | 120° |
| 3 | 180° |
| . | . |
| . | . |
| . | . |
| 5 | 300° |

Each angle $\theta_{IRi}$ is subtracted from the direction angle $\theta_D$ and, when the absolute value is less than one-half the beam width, e.g., 30°, that sensor number i is designated as forward-facing sensor $IR_D$, step 456.

Next, the nearest IR sensor in alarm, $IR_a$, which is in alarm and nearest in azimuthal orientation to forward-facing sensor $IR_D$ is located, step 458. This may be accomplished according to the formula $$i = \sigma_k(k+1)/2 + (1-\sigma_k)(n-k/2) \qquad (1)$$

where i is the sensor number with forward-facing sensor $IR_D$, k is a counter constant begins at zero, n is the number of active sensors, and $sigma_k$ is equal to zero when k is even and equal to one when k is odd. The equation (1) generates alternating examination of sensor elements as 0, 1, n−1, 2, n−2, 3, . . .

The azimuthal heading ofthe nearest sensor in alarm $IR_A$ is represented by angle $\theta_{IR}$. The turn angle $\theta_t$ is equal to the orientation of the nearest active sensor $\theta_{IRa}$ minus head direction angle $\theta_D$, step 460. The turn angle $\theta_t$ is output to mobile module 224, FIG. 3, and the head is turned to face the alarm, steps 462, 464, respectively.

While in the specific embodiment explained herein the infrared sensors are the ones on the body of the robot and they are the ones that are looked to for the first intrusion indication, and the microwave sensors are placed on the head and are looked to for the second indication of an intrusion after they are rotated to align with the infrared sensor, this is not a necessary limitation of the invention. First, the sensors need not be infrared or microwave. Second, either one can be the first indicator of the intrusion and the other one the second. Either one may be on the body and the other on the head; either one may be the stationary one and the other may be the one that moves to align. In addition, they need not be on separate relatively movable parts. For example, both sensors may be on the head. The first sensor at the zero position may sense an apparent intrusion; then the second sensor at 90° and of a different type may be rotated to the zero position so that it faces the same target area and then it too is checked for indication of an apparent intrusion. If the two of them have seen a possible intrusion in the same target area then a confirmed intrusion alarm may be indicated. The types of sensors are certainly not limited to infrared and microwave; ultrasonic, sound, visible radiation, ultraviolet, and chemical detection may all be used, so long as one type of detector acts first to sense an intrusion and then causes a second different type of transducer to look in the same target area to confirm or refuse to confirm an actual intrusion.

Although specific features of the invention are shown in some drawings and not others, this is for convenience only as each feature may be combined with any or all of the other features in accordance with the invention.

Other embodiments will occur to those skilled in the art and are within the following claims.

What is claimed is:

1. An intrusion detection system comprising:
   first sensor means for monitoring a first condition and second sensor means for monitoring a second condition in a space to be protected against intruders;
   means, responsive to a change in the condition sensed by said first sensor means in a target area, for aligning said second sensor means with said target area; and
   means, responsive to a change in the condition sensed by said second sensor means and said first sensor means, for indicating an intrusion.

2. The intrusion detection system of claim 1 in which one of said sensor means is an infrared sensor and the other sensor means is a microwave sensor.

3. The intrusion detection system of claim 1 in which one of said sensor means includes a plurality of sensing elements.

4. The intrusion detection system of claim 3 in which each sensor element has a different field of view.

5. The intrusion detection system of claim 1 in which said first and second sensor means are movable relative to each other.

6. The intrusion detection system of claim 1 in which both said first and second sensor means are movable with each other.

7. The intrusion detection system of claim 1 further including:
   means for progressively increasing the sensitivity of at least one of said sensor means;
   means responsive to a change in condition sensed by one of said sensor means for halting the increase in sensitivity and reinterrogating that sensor a predetermined number of times; and
   means for calculating an alarm value as a function of the ratio of the number of alarms to the number of reinterrogations and of the sensitivity level.

8. The intrusion detection system of claim 1 in which at least one of said sensor means is a microwave sensor.

9. The intrusion detection system of claim 8 in which said microwave sensor includes a microwave antennae for emitting microwave energy and receiving a reflected microwave signal.

10. The intrusion detection system of claim 9 in which said antennae emits radiation at a first frequency and further includes:
    means for mixing the returned signal with the output signal to obtain a difference signal;
    threshold means for setting the alarm sensitivity threshold;
    comparator means for providing an alarm output when said difference signal exceeds said threshold; and
    means for varying the alarm sensitivity threshold provided by said threshold means.

11. The intrusion detection system of claim 10 further including a vehicle.

12. The intrusion detection system of claim 11 further including:
    means for determining the velocity of said vehicle;
    filter means, interconnected between the antennae and said comparator means, and responsive to said means for determining the velocity of the vehicle; for blocking the Doppler component of said difference signal imparted by said vehicle velocity.

13. The intrusion detection system of claim 11 in which said vehicle includes:
    drive wheels and a drive system including a drive motor; and
    an encoder, responsive to said motor for indicating the velocity of said vehicle.

14. The intrusion detection system of claim 13 in which said vehicle includes a body section and a head section and said body section includes said drive wheels, drive system and encoder.

15. The intrusion detection system of claim 14 further including means for rotating said sections relative to one another.

16. The intrusion detection system of claim 15 in which said body section includes a steering system for steering said drive wheels.

17. The intrusion detection system of claim 16 in which said head section is coupled with said steering system to rotate relative to said body section in synchronism with said drive wheels.

18. The intrusion detection system of claim 16 in which one of said sensor means is on one of said sections and the other sensor means is on the other section.

19. The intrusion detection system of claim 18 in which said first sensor means includes IR sensing means and is mounted on said body section and said second sensor means includes microwave sensor means and is mounted on said head section.

20. An intrusion detection system for a mobile robot including a relatively rotatable head section and body section, the body section including drive wheels, a drive motor, and a drive system driven by the drive motor to drive the drive wheels, comprising:
    first sensor means for monitoring a first condition and second sensor means for monitoring a second condition in a space to be protected against intrusion; one of said sensor means being on one of said sections, the other sensor means being on the other section;
    means, responsive to a change in condition sensed by said first sensor means in a target area for aligning said second sensor means with said target area; and means, responsive to a change in the condition sensed by said first sensor means and said second sensor means for indicating an intrusion.

21. The intrusion detection system for a mobile robot of claim 20 in which one of said sensor means senses IR and the other senses microwave radiation.

22. The intrusion detection system for a mobile robot of claim 21 in which said first sensor means senses IR and the second senses microwave radiation.

23. The intrusion detection system for a mobile robot of claim 20 in which said first sensor means is disposed on said body section and said second sensor means is disposed on said head section.

24. The intrusion detection system for a mobile robot of claim 21 in which said sensor means that senses IR includes a plurality of spaced sensing elements.

25. The intrusion detection system of claim 20 further including:
- means for progressively increasing the sensitivity of at least one of said sensor means;
- means responsive to a change in condition sensed by one of said sensor means for halting the increase in sensitivity and reinterrogating that sensor a predetermined number of times; and
- means for calculating an alarm value as a function of the ratio of the number of alarms to the number of reinterrogations and of the sensitivity level.

26. The intrusion detection system of claim 21 in which said microwave sensor includes a microwave antennae for emitting microwave energy and receiving a reflected microwave signal.

27. The intrusion detection system of claim 26 in which said antennae emits radiation at a first frequency and further includes:
- means for mixing the returned signal with the output signal to obtain a difference signal;
- threshold means for setting the alarm sensitivity threshold;
- comparator means for providing an alarm output when said different signal exceeds said threshold; and
- means for varying the alarm sensitivity threshold provided by said threshold means.

28. The intrusion detection system of claim 27 further including:
- velocity means for determining the velocity of said robot;
- filter means, interconnected between the antennae and said comparator means, and responsive to said velocity means, for blocking the Doppler component of said difference signal imparted by said robot velocity.

29. The intrusion detection system of claim 20 in which said body section includes a steering system for steering said drive wheels.

30. The intrusion detection system of claim 29 in which said head section is coupled with said steering system to rotate relative to said body section in synchronism with said drive wheels.

* * * * *